United States Patent
Fan et al.

(10) Patent No.: US 8,525,876 B2
(45) Date of Patent: Sep. 3, 2013

(54) REAL-TIME EMBEDDED VISION-BASED HUMAN HAND DETECTION

(75) Inventors: Wensheng Fan, Plano, TX (US); WeiYi Tang, Plano, TX (US)

(73) Assignee: VisionBrite Technologies Inc., Plano, TX (US)

( * ) Notice: Subject to any disclaimer, the term of this patent is extended or adjusted under 35 U.S.C. 154(b) by 604 days.

(21) Appl. No.: 12/778,341

(22) Filed: May 12, 2010

(65) Prior Publication Data

US 2011/0279663 A1    Nov. 17, 2011

(51) Int. Cl.
- *H04N 9/47* (2006.01)
- *H04N 7/18* (2006.01)
- *H04N 1/40* (2006.01)

(52) U.S. Cl.
USPC ............................................. 348/77; 358/447

(58) Field of Classification Search
USPC .......................................... 348/77; 345/173
See application file for complete search history.

(56) References Cited

U.S. PATENT DOCUMENTS

| | | | | | |
|---|---|---|---|---|---|
| 5,790,269 | A | * | 8/1998 | Masaki et al. | 358/447 |
| 2011/0102570 | A1 | * | 5/2011 | Wilf et al. | 348/77 |

OTHER PUBLICATIONS

Xu et al. "Peg-Free Human Hand Shape Analysis and Recognition", ICASSP 2005, II-77-II-80.*

* cited by examiner

*Primary Examiner* — Christopher S Kelley
*Assistant Examiner* — Hee-Yong Kim

(57) ABSTRACT

In one aspect there is provided an embodiment of an image capture device comprising a camera, an image processor, a storage device and an interface. The camera is configured to capture images in ambient light of a human hand in a field of view (FOV) of the camera. The image processor is configured to process a first one of the images to detect a presence of the hand. The image capture device is configured to assign a position of the presence of the hand, track movement of the hand within the FOV by processing at least a second one of the images and generate a command based on the tracked movement of the hand within the FOV. The interface is configured to transmit the detection of the presence of the hand, the assigned position of the hand and the command to an external apparatus.

20 Claims, 7 Drawing Sheets

REAL-TIME EMBEDDED VISION-BASED HUMAN HAND DETECTION

This application claims the benefit of U.S. Provisional Application No. 61/260,944 filed on Nov. 13, 2009 entitled "REAL TIME VISION BASED HUMAN HAND RECOGNITION AND TRACKING METHOD AND TOUCHLESS VISION BASED COMMAND SYSTEM INCORPORATING THE SAME."

TECHNICAL FIELD

This application is directed, in general, to an image capture device and a method of detecting a presence of a human hand in a field of view of the image capture device.

BACKGROUND

Real-time vision-based human hand recognition has typically been focused on fingerprint recognition and palm print recognition for authentication applications. These conventional recognition methods process a small amount of hand feature data and usually execute on large, expensive computer systems in a non-real-time fashion. To recognize a human hand out of complex backgrounds, tracking hand movement and interpreting hand movements into predefined gesture identification have conventionally been limited by capabilities of imaging systems and image signal processing systems and typically involve a database for pattern matching, requiring a significant amount of computing power and storage.

Conventional human control system interfaces generally include human to computer interfaces, such as a keyboard, mouse, remote control and pointing devices. With these interfaces, people have to physically touch, move, hold, point, press, or click these interfaces to send control commands to computers connected to them.

SUMMARY

One aspect provides a method. In one embodiment, the method includes capturing images of a hand in a field of view (FOV) of a camera of an image capture device. The method further includes processing a first one of the images to detect a presence of a hand, assigning a position of the presence of the hand, tracking movement of the hand, generating a command based on the tracked movement of the hand within the FOV and communicating the presence, position and command to an external apparatus. The processing of the first one of the images to determine the presence of the hand is completed by an image processor of the image capture device. The assignment of a position of the presence of the hand is completed by the image capture device. The tracking of the movement of the hand is accomplished by similarly processing, as the first image was processed by the image processor of the image capture device, of at least a second one of the captured images. The generating of the command is performed by the image capture device as is the transmitting the presence of the hand, the position of the hand and the command itself.

Another aspect provides an image capture device. In one embodiment, the image capture device includes a camera, an image processor, a storage device and an interface. The camera is coupled the image processor and storage device and the image processor is coupled the storage device and an interface. The camera is configured to capture images in ambient light of a human hand in a field of view (FOV) of the camera. The image processor is configured to process a first one of the images to detect a presence of the hand. The image capture device is configured to assign a position of the presence of the hand, track movement of the hand within the FOV by processing at least a second one of the images and generate a command based on the tracked movement of the hand within the FOV. The interface is configured to transmit the detection of the presence of the hand, the assigned position of the hand and the command to an external apparatus.

BRIEF DESCRIPTION

Reference is now made to the following descriptions taken in conjunction with the accompanying drawings, in which.

DETAILED DESCRIPTION

Missing in today's conventional solutions is an image capture device that operates in real-time and can communicate with a conventional computer that: requires no physical interface; needs only ambient light; requires no angular, positional, or velocity information of a hand as it enters a monitored area; is seamless with respect to different hands presented in the monitored area; and is not sensitive to a size or skin color of the hand in the monitored area.

Figure 1:
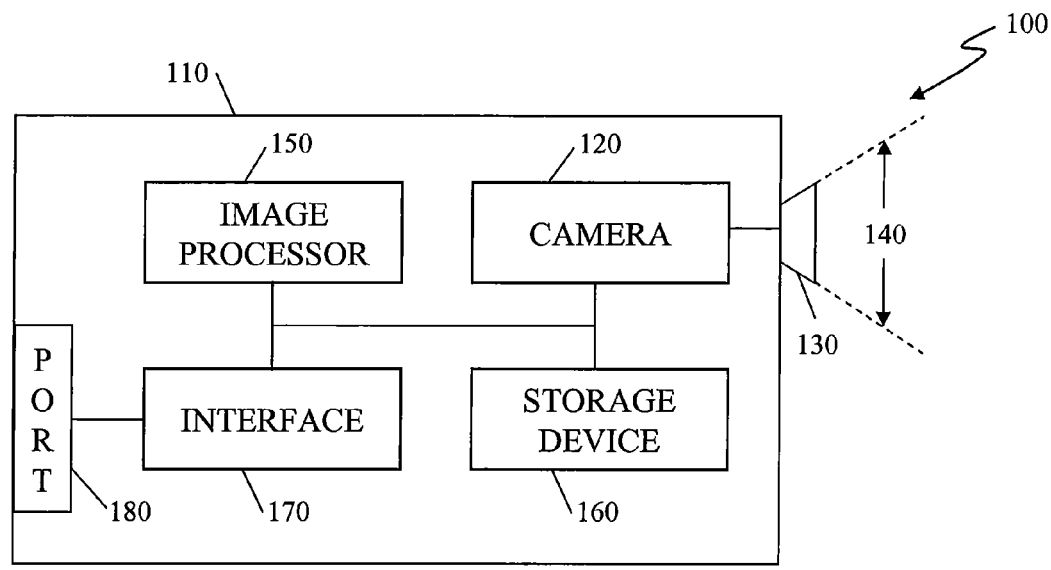
FIG. 1 illustrates a block diagram of an embodiment of an image capture device.

FIG. 1 illustrates an embodiment 100 of an image capture device 110. The image capture device 100 includes a camera 120, a lens 130, an image processor 150, a storage device 160, an interface 170 and an external communication port 180. The camera 120 is coupled to the lens 130 and captures an image in a field of view (FOV) 140. The camera 120 couples to the image processor 150 and the storage device 160. Images captured by the camera 120 are stored in the storage device 160 in conventional manners and formats. The interface 170 is coupled to the image processor 150 and the external communication port 180. The external communication port 180 supports known and future standard wired and wireless communication formats such as, e.g., USB, RS-232, RS-422 or Bluetooth®. Image processor 150 is also coupled to the storage device 160 to store certain data described below. The operation of various embodiments of the image capture device 110 will now be described. In other embodiments of an image capture device, a conventional camera could be used in place of the camera 120 of the embodiment of FIG. 1. The conventional camera could communicate with the image capture device using conventional standards and formats, such as, e.g., USB and Bluetooth®.

Figure 2:
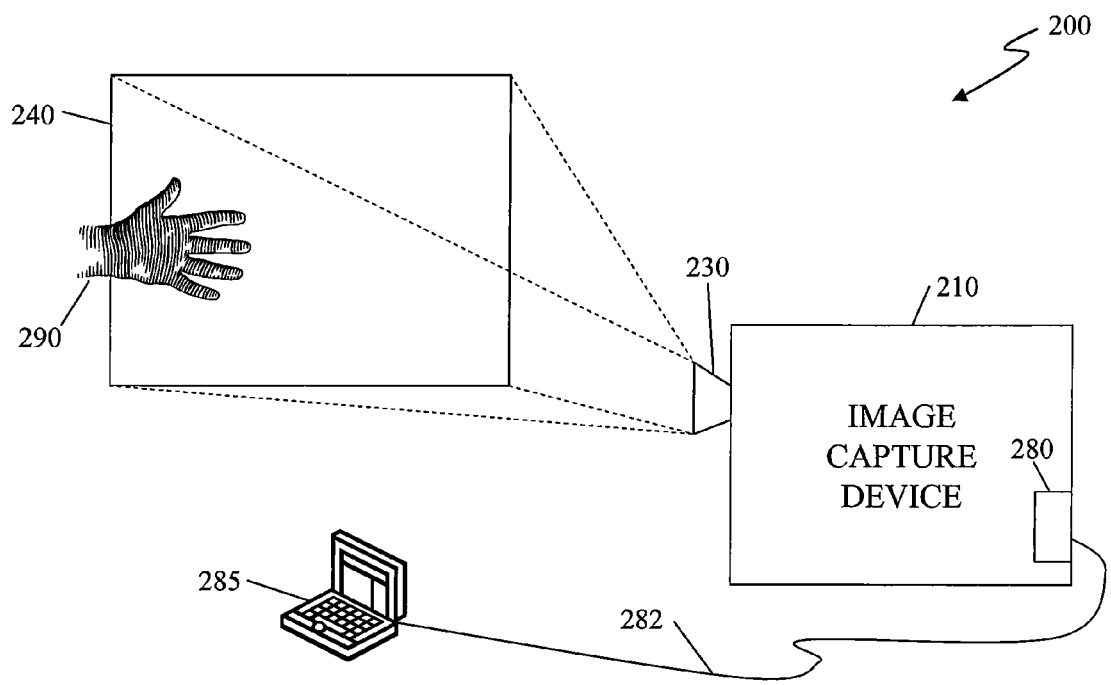
FIG. 2 illustrates a block diagram of an embodiment of the image capture device relative to a field of vision and human hand.

FIG. 2 illustrates an embodiment 200 of an image capture device 210, similar to the image capture device 110 of FIG. 1. FIG. 2 shows the image capture device 210 coupled to an external apparatus 285 via a coupling 282. An external apparatus 285 is depicted as a conventional laptop computer but could be any other handheld electronic computing device, such as but not limited to a PDA, or smartphone. The coupling 282 can be a wired or wireless coupling of conventional standards, as listed above and further standards. FIG. 2 shows an FOV 240 of a lens 230 of the image capture device 210. The embodiment 200 illustrated in FIG. 2 allows for a detection and position of a hand 290 in the FOV 240 to be communicated to the external apparatus 285 in a manner detailed below. The illustrated embodiment 200 provides an embedded solution that only transmits a limited amount of data, i.e., presence and position detection of a human hand and commands corresponding to movement of the presence of the human hand, to be used by a conventional computer. There is no need, with the embodiment illustrated in FIG. 2 to transmit large amounts of image data. Furthermore, image capture device 210 in the embodiment of FIG. 2 typically operates in real time, often operating on 30 frames of image per second. In other embodiments, the image capture device 210 may not include a camera, as described in an embodiment above, and plug in to a standard USB port on the external apparatus 285.

Figure 3:
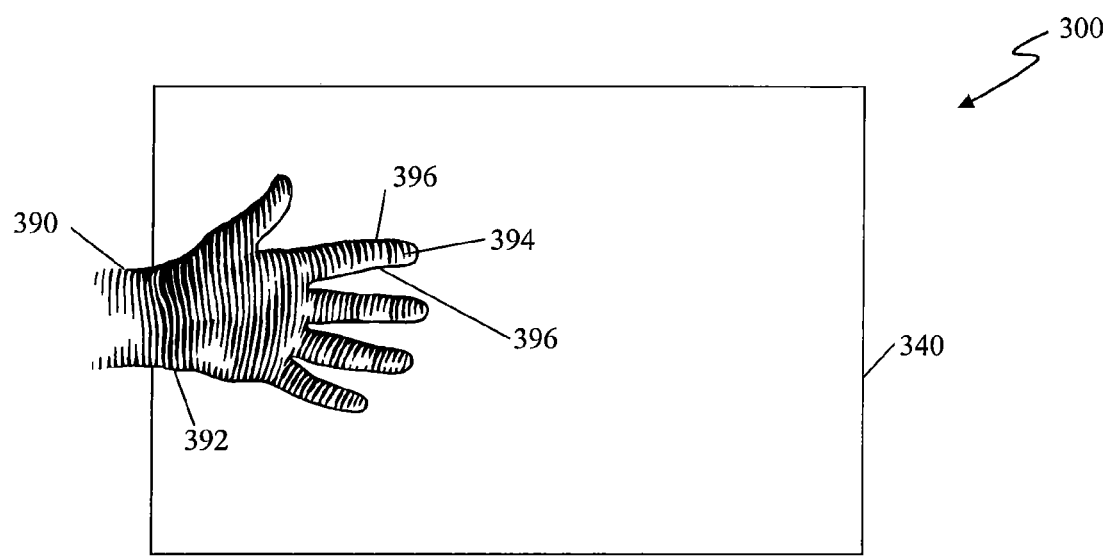
FIG. 3 illustrates a block diagram of an embodiment of details of a human hand in a field of vision.

FIG. 3 illustrates in further detail the hand 290 in the FOV 240 of FIG. 2. An embodiment 300 illustrated in FIG. 3 illustrates a hand 390 in an FOV 340. The image capture device 210 of FIG. 2 (not shown) searches for a first contour line 392 of the hand 390 that starts at a border of the FOV 340. Second contour lines 396 are contour lines of each edge of a finger 394 of the hand 390. The first contour line 392 and the second contour lines 396, as discussed below, help the image capture device 210 determine a presence of the hand 390 in the FOV 340.

Figure 4:
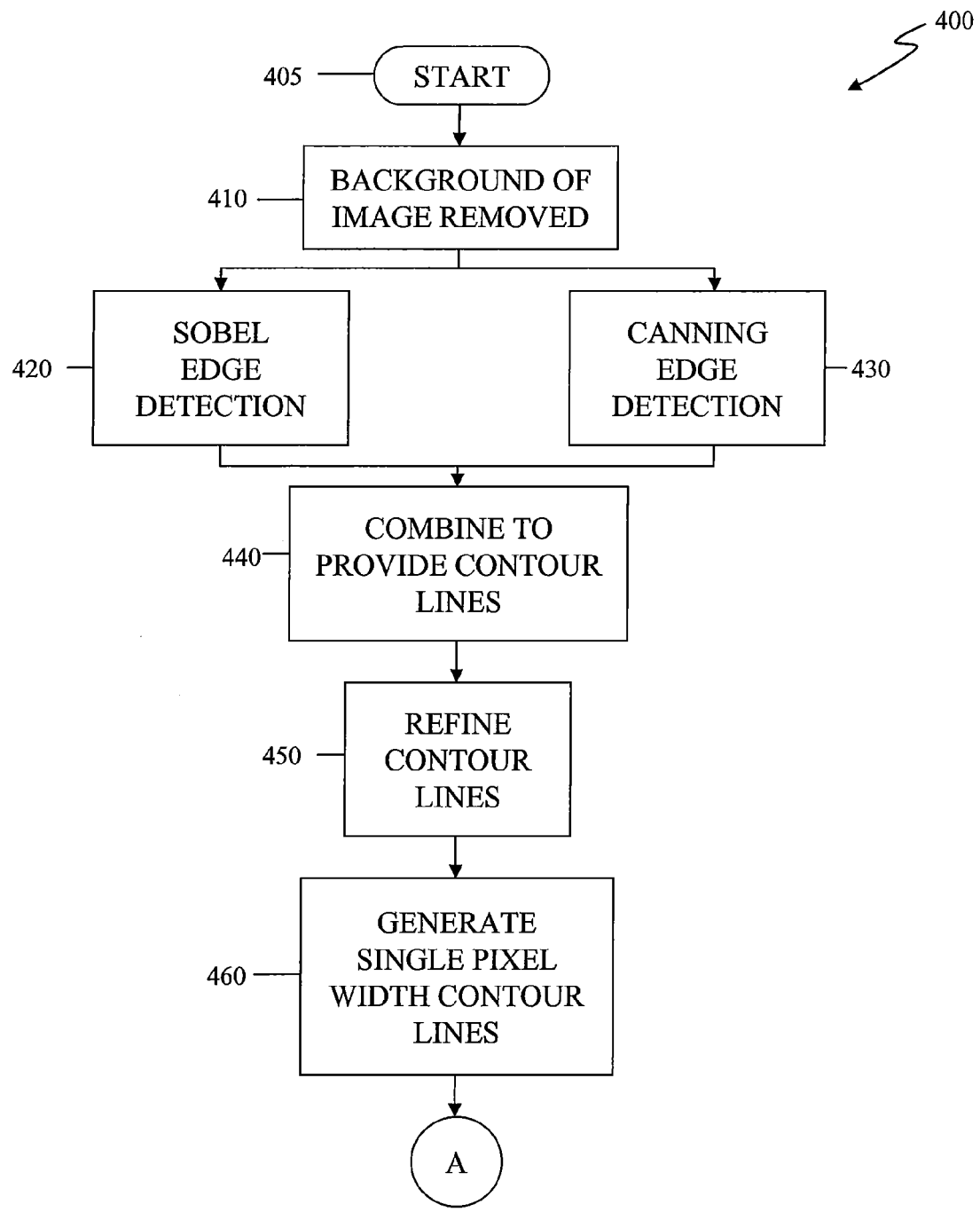
FIGS. 4-6 illustrate a flow diagram of an embodiment of a method of an image capture device.
Figure 5:
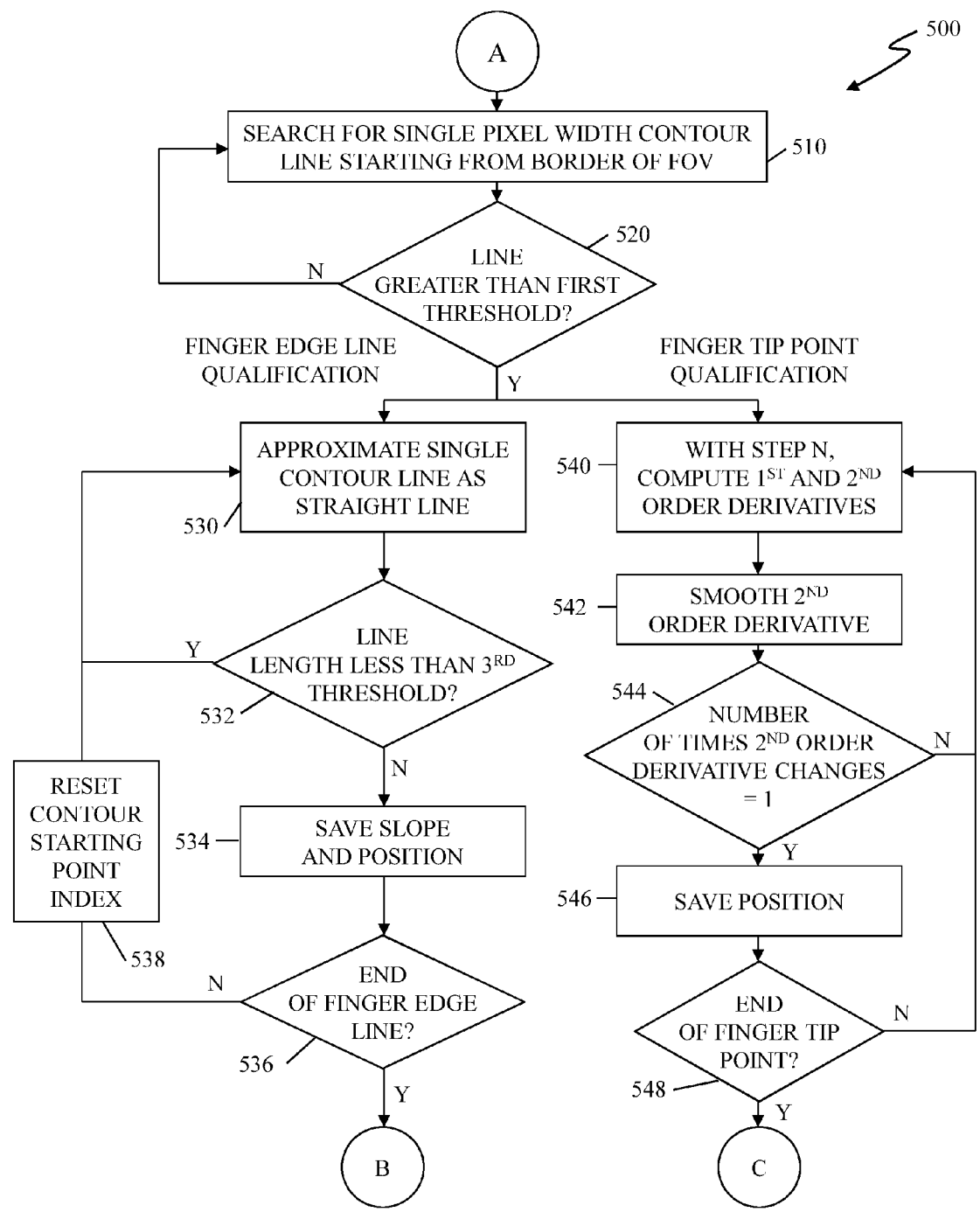
Figure 6:
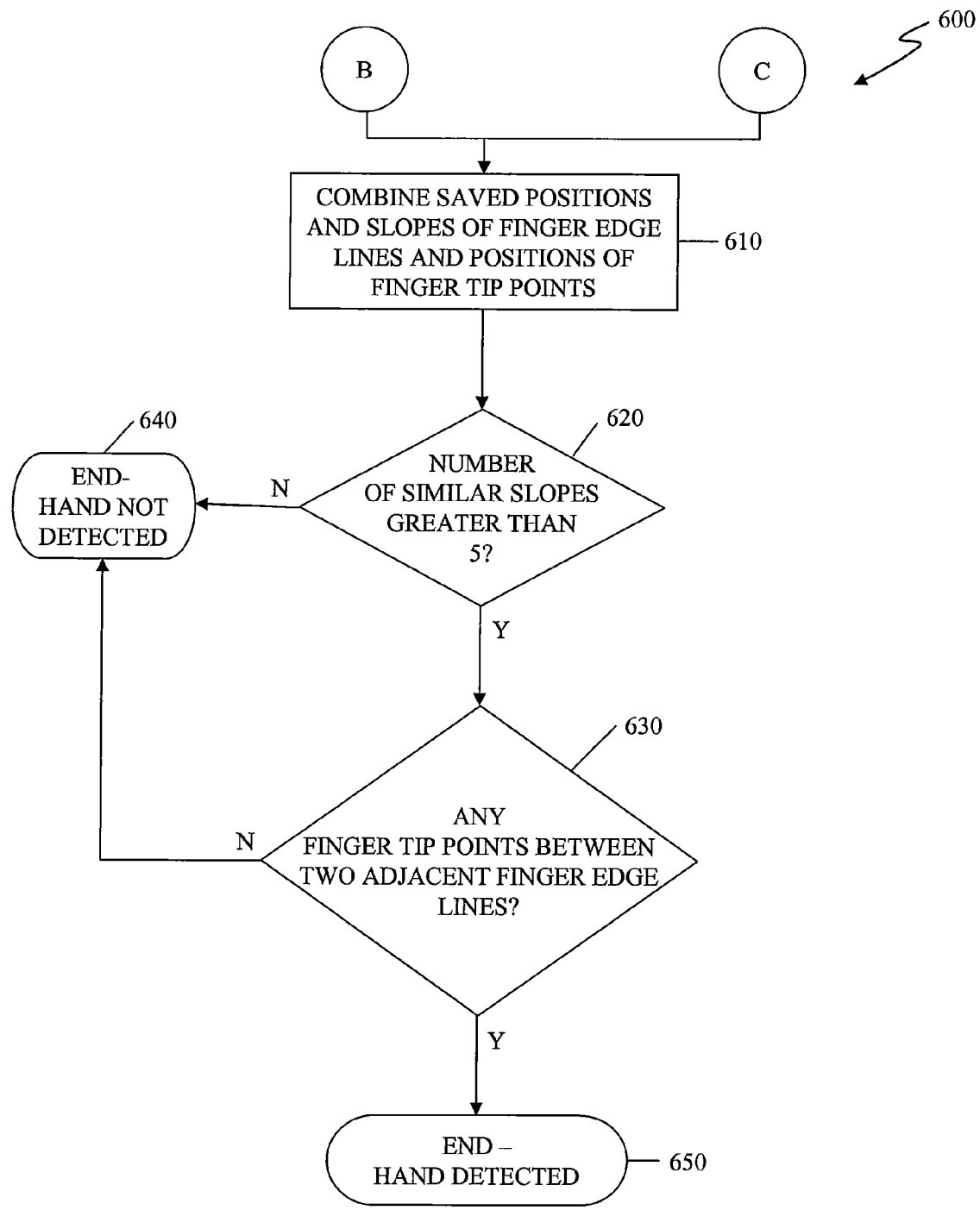

FIGS. 4-6 illustrate an embodiment of a method the image capture device 110/210 may use to determine a presence and position of the hand 390 in the FOV 340. FIG. 4 illustrates a first portion 400 of a flow diagram of a method used by the image capture device 110, 210 to determine a presence and position of a hand in an FOV. The method begins at a step 405.

In a step 410, a background of an image in an FOV is removed. A Sobel edge detection method may be applied to the remaining image in a step 420. In a step 430, a Canning edge detection is also applied to the remaining image from the step 410. A Sobel edge detection result from the step 420 is combined in a step 440 with a Canning edge detection result from the step 430 to provide thin edge contour lines less likely to be broken. The thin edge contour lines produced in the step 440 are further refined in a step 450 by combining split neighboring edge points into single edge points. The result of the step 450 is that single pixel width contour lines are generated in a step 460. The first portion 400 of the method ends in point A.

FIG. 5 illustrates a second portion 500 of the flow diagram of the method and begins at point A from the first portion 400 of FIG. 4. In a step 510, the method searches for a single pixel width contour line that starts from a border of FOV 340 of FIG. 3. After a single pixel contour line that starts from a border of the FOV is found, a step 520 determines if a length of that line is greater than a first threshold. If the length of the single pixel contour line is less than the first threshold, the method returns to the step 510 to find another single pixel contour line that starts at the border of the FOV. If the length of the single pixel contour line is greater than the first threshold, the method initially considers the single pixel contour line as a candidate for the presence of a hand in the FOV. At this point, the method in the second portion 500 of the flow diagram qualifies the candidate single pixel contour line as either a finger edge line or a finger tip point. Steps 530-538 describe the qualification of a finger edge line, and steps 540-548 describe the qualification of a finger tip point.

In a step 530, the finger edge line qualification method begins and the candidate single pixel contour line is continuously approximated into a straight line. If the straight line approximation of the single pixel contour line falls below a second threshold, the method continues to a step 532 where a length of the candidate single pixel contour line with a straight line approximation below the second threshold is compared to a third threshold. If the length of the line is less than the third threshold, the method does not consider the line a finger edge line and the method returns to the step 530. If the length of the line is greater than the third threshold, the line is considered a finger edge line and the method continues to a step 534 where a slope of the finger edge line is calculated and the slope and a position of the finger edge line is saved in the storage device 160 of the image capture device 110 of FIG. 1. The method continues to a step 536 where a determination is made of an end of the finger edge line. If an end of a finger edge line is determined, then the stored slope and length represent a final slope and length of the finger edge line and the finger edge line qualification method ends at point B. If an end of the finger edge line is not determined, the method resets a contour starting point index in a step 538 and the method returns to the step 530.

In a step 540, the finger tip point qualification method begins and the candidate single pixel contour line is continuously approximated into a straight line. If the straight line approximation of the single pixel contour line is greater than the second threshold, a first order derivative and second order derivative of the candidate single pixel contour line is computed in the step 540. The step size for the first and second order derivatives is at least one tenth of a width of the FOV. In a step 542, the second order derivative of the candidate single pixel contour line is smoothed to remove noise points that may be included in the candidate single pixel contour line. Because of the shape of a finger tip, the second order derivative of the candidate single pixel contour line should change signs once. In a step 544, a determination of a number of times the computed second order derivative changes and if the number of sign changes is not one, the method continues back to the step 540. If the number of times the second order derivative changes is one, a position of the finger tip point is stored in a step 546 in the storage device 160 of the image capture device 110 of FIG. 1. A step 548 determines if the finger tip point ends. If the finger tip point ends, as determined by the step 548, the finger tip point qualification method ends at point C. If an end of the finger tip point is not determined in the step 548, the method returns to the step 540.

FIG. 6 illustrates a third portion 600 of the flow diagram of the method and begins at points B and C from the second portion 500 of FIG. 5. In a step 610, the saved position and slope of the finger edge line and the saved position of the finger tip point stored in the storage device 160 of the image capture device 110 of FIG. 1 is combined for processing. In a step 620, a determination is made if at least five of the saved slopes are substantially the same. If at least five of the saved slopes are not substantially the same, the method ends without a determination of a presence of the hand and assignment of a position of the hand in a step 640. If at least five of the saved slopes are substantially the same, as determined in the step 620, the method continues to a step 630 where a determination is made if any of the saved positions of the finger tip points are between any two adjacent finger edge lines. If none of the saved finger tip points are between any two adjacent finger edge lines, the method ends without a determination of a presence of the hand and assignment of a position of the hand in the step 640. If any of the saved finger tip positions are between any two adjacent finger edge lines, the method ends with a determination of a presence of a hand and an assignment of a position of the hand, based on the stored positions of the finger edge lines and finger tip points, in a step 650. The determination of a presence of the hand and the assignment of the position of the hand is made available by the interface 160 to the external communication port 180 of the image capture device 110 of FIG. 1 and can be sent via the coupling 282 to the external apparatus 285 of FIG. 2. The determination of a presence of a hand and an assignment of a position of the hand may take at least 0.5 seconds.

The method described in the portions of the flow diagrams of FIGS. 4-6 does not require that a relative angle of an orientation of a hand in an FOV be known. The method also does not require any pre-detection training with the hand prior to implementing the method.

Figure 7:
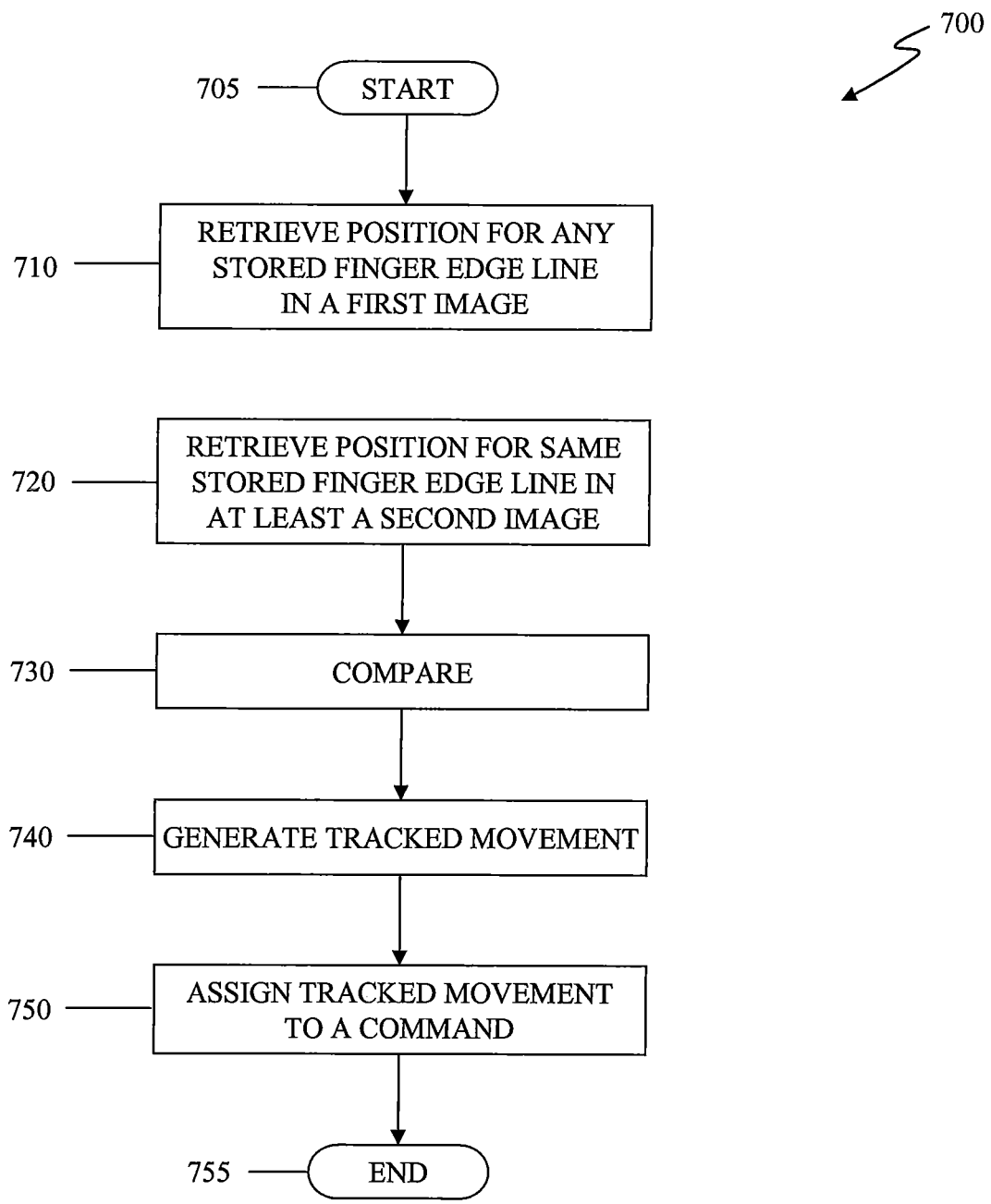
FIG. 7 illustrates a block diagram of an embodiment of tracking movement in an image capture device.

FIG. 7 illustrates an embodiment of a flow diagram describing a method to track movement with an image capture device. The method 700 begins at a step 705. In a step 710, a position for any stored finger edge line of a first image, the determination of which is described above, is retrieved from a storage device of the image capture device. In a step 720, a position of the same finger edge line in at least a second image, the determination of which is also described above, is retrieved from the storage device of the image capture device. These positions are compared in a step 730, and a tracked movement is generated in a step 740 by the image capture device. In a step 750, the image capture device assigns a command to the tracked movement. Examples of a tracked movement may be move right, move left, move up, move down, or move diagonally. The method 700 ends in a step 755. The command can be sent from the interface 170 and the external communication port 180 of the image capture device 110 of FIG. 1 via the coupling 282 to the external apparatus 285 of FIG. 2.

An application for the image capture device described above may be, but not limited to, associating an object in a field of view to a hand in the same field of view and moving the object based on recognizing the presence and position of the hand. One example of this embodiment could be a medical procedure where a surgeon, for example, would command operation of equipment during a surgery without physically touching any of the equipment. Another example of this embodiment could be a presenter in front of a projection screen that has objects displayed on it. The image capture device would recognize the presence of a hand of the presenter and associate a position of the hand to one of the objects displayed on the screen. An external apparatus, such as the conventional laptop computer 285 of FIG. 2, would receive a position of the hand from the image capture device and associate the position of the hand with an object displayed on the screen. The external apparatus would then cause the object displayed on the screen to move corresponding to a received command of a tracked movement of the hand by the image capture device.

Figure 8:
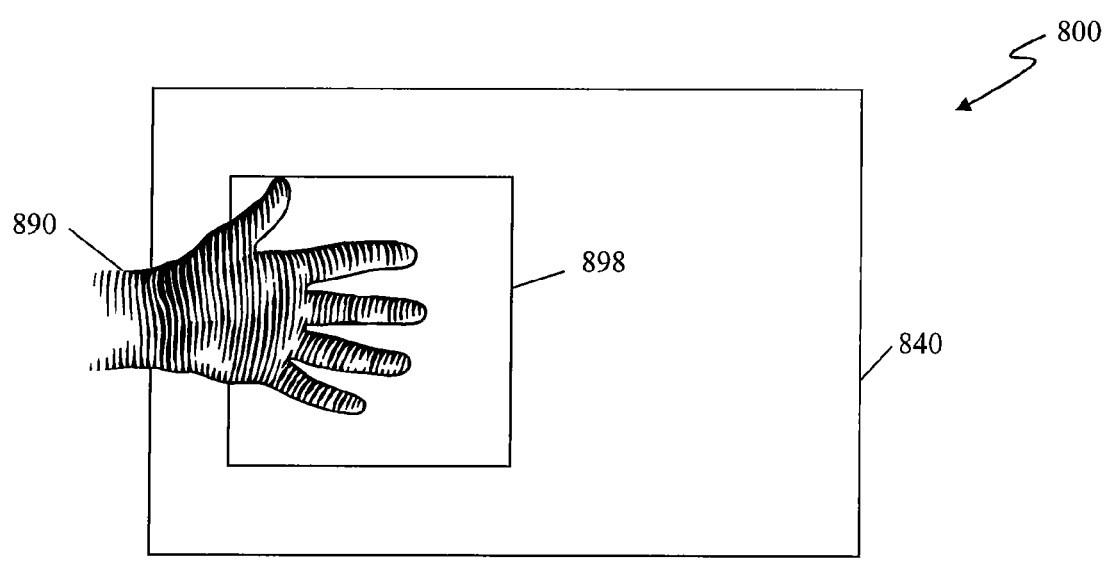
FIG. 8 illustrates a block diagram of another embodiment of an image capture device.

FIG. 8 illustrates an embodiment 800 of the example of a presenter described above. The embodiment 800 includes an image capture device and an external apparatus (not shown), such as the image capture device 210 and the conventional laptop computer 285 depicted in FIG. 2. The external apparatus either includes or interfaces to a projector that displays an object 898, such as a Microsoft PowerPoint® object, on a screen. The screen with the displayed object 898 is in an FOV 840 of the camera of the image capture device. The image capture device detects the presence and position of a hand 890 of the presenter in the FOV 840 and transmits it to the conventional laptop computer. The conventional laptop computer associates the position of the hand 890 of the presenter with a position of the object 898. The image capture device then tracks a movement of the hand 890 of the presenter (move up, move down, etc.), as described above and assigns a corresponding command (move up, move down, etc.) based on the tracked movement of the hand 890 of the presenter. The presence, positional data and command are then transmitted to the external apparatus that then causes the displayed object to move according to the command (moves displayed object up, down, etc.)

Certain embodiments of the invention further relate to computer storage products with a computer-medium that have program code thereon for performing various computer-implemented operations that embody the vision systems or carry out the steps of the methods set forth herein. The media and program code may be those specially designed and constructed for the purposes of the invention, or they may be of the kind well known and available to those having skill in the computer software arts. Examples of computer-readable media include, but are not limited to: magnetic media such as hard disks, floppy disks and magnetic tape; optical media such as CD-ROM disks; magneto-optical media such as optical disks; and hardware devices that are specifically configured to store and execute program code, such as ROM and RAM devices. Examples of program code include both machine code, such as produced by a compiler and files containing higher level code that may be executed by the computer using an interpreter.

Those skilled in the art to which this application relates will appreciate that other and further additions, deletions, substitutions and modifications may be made to the described embodiments.

What is claimed is:

1. A method, comprising:
   capturing images, with a camera of an image capture device, in ambient light of a human hand in a field of view (FOV) of said camera;
   processing, by an image processor of said image capture device, a first one of said images to detect a presence of said hand, wherein said processing includes the steps of:
      determining if a first contour line starting from a border of said FOV is longer than a first threshold;
      determining, when said first contour line is longer than said first threshold, second contour lines for each of two edges of at least three fingers from said first one of said images of said hand in said FOV;
      generating single pixel width contour lines from each of said second contour lines; and
      determining if said single pixel width contour lines are finger edge or finger tip points, wherein said determining if said single pixel width contour lines are finger tip points comprises the steps of:
         computing a first and second derivative of each of said single pixel width contour lines when a straight line approximation of said single pixel width contour line is greater than a second threshold; and
         determining if each of said single pixel width contour lines with said straight line approximation greater than said second threshold is said finger tip point when a sign of said computed second derivative changes once;
   assigning, by said image capture device, a position of said presence of said hand;
   tracking, by said image capture device, movement of said hand within said FOV by processing at least a second one of said images;
   generating, by said image capture device, a command based on said tracked movement of said hand within said FOV; and
   transmitting, with an interface, said detection of said hand, said position of said hand, and said command to an external apparatus.

2. The method as recited in claim 1 wherein said determining if said single pixel width contour lines are finger edge lines comprises the steps of:
- approximating each of said single pixel width contour lines as a straight line when said straight line approximation is below said second threshold;
- determining a length of each of said approximated straight lines;
- determining if each of said approximated straight lines is one of said finger edge lines when said length is greater than a third threshold; and
- storing a slope and position of each of said finger edge lines in a storage device of said image capture device.

3. The method as recited in claim 2 wherein said determining if said single pixel width contour lines are finger tip points further comprises the step of:
- storing a position of each of said finger tip points in said storage device of said image capture device.

4. The method as recited in claim 3 wherein said detection of said presence of said hand comprises the steps of:
- determining if said stored slope of at least five finger edge lines are substantially the same; and
- determining if said position of at least one of said finger tip points is between two adjacent ones of said finger edge lines.

5. The method as recited in claim 3 wherein said generating a position of said presence of said hand is based on said position of each of said finger edge lines and said position of each of said finger tip points after said hand has remained substantially still for at least 0.5 seconds.

6. The method as recited in claim 3 wherein said tracking comprises the steps of:
- comparing said position for any of said stored finger edge lines in said first one of said images with a position for a same one of at least five finger edge lines determined in said at least second one of said images; and
- generating said tracked movement command based on said comparing.

7. The method as recited in claim 1 wherein a relative angle of hand orientation in said FOV is not required.

8. The method as recited in claim 1 wherein said detection of said presence of said hand does not require a pre-detection training sequence with said hand.

9. The method as recited in claim 1 further comprising associating, by said external apparatus, said position of said presence of said hand with an object displayed by said external apparatus in said FOV.

10. The method as recited in claim 9 wherein said object displayed by said external apparatus in said FOV is moved corresponding to said command.

11. An image capture device, comprising:
- a camera;
- an image processor;
- a storage device; and
- an interface wherein:
  - said camera is configured to capture images in ambient light of a human hand in a field of view (FOV) of said camera,
  - said image processor is configured to:
    - process a first one of said images to detect a presence of said hand,
    - determine if a first contour line starting from a border of said FOV is longer than a first threshold,
    - determine, when said first contour line is longer than said first threshold, second contour lines for each of two edges of at least three fingers from said first one of said images of said hand in said FOV,
    - generate single pixel width contour lines from each of said second contour lines; and
    - determine if said single pixel width contour lines are finger edge lines or finger tip points, wherein said determining if said single pixel width contour lines are finger tip points by:
      - computing a first and second derivative of each of said single width contour lines when a straight line approximation of said single pixel width contour line is greater than a second threshold, and
      - determining if each of said single pixel width contour lines with said straight line approximation greater than said second threshold is said finger tip point when a sign of said computed second derivative changes once,
  - said image capture device is configured to:
    - assign a position of said presence of said hand,
    - track movement of said hand within said FOV by processing at least a second one of said images, and
    - generate a command based on said tracked movement of said hand within said FOV, and
  - said interface is configured to transmit said detection of said hand, said position of said hand, and said command to an external apparatus.

12. The image capture device as recited in claim 11 wherein said image processor is further configured to determine if said single pixel width contour lines are finger edge lines by:
- approximating each of said single pixel width contour lines as a straight line when said straight line approximation is below said second threshold;
- determining a length of each of said approximated straight lines; and
- determining if each of said approximated straight lines is one of said finger edge lines when said length is greater than a third threshold, wherein a slope and position of each of said finger edge lines is stored in said storage device.

13. The image capture device as recited in claim 12 wherein a position of each of said finger edge lines is stored in said storage device.

14. The image capture device as recited in claim 13 wherein said image processor if further configured to detect said presence of said hand by:
- determining if said stored slope of at least five finger edge lines are substantially the same; and
- determining if said position of at least one of said finger tip points is between two adjacent finger edge lines.

15. The image capture device as recited in claim 13 wherein said image capture device is further configured to assign a position of said presence of said hand based on said position of each of said finger edge lines and said position of each of said finger tip points after said hand has remained substantially still for at least 0.5 seconds.

16. The image capture device as recited in claim 13 wherein said image capture device is further configured to track movement of said hand by:
- comparing said position of any of said stored finger edge lines in said first one of said images with a position for a same one of at least five finger edges determined in said at least second one of said images; and
- generating said tracked movement command based on said comparing.

17. The image capture device as recited in claim 11 wherein a relative angle of hand orientation in said FOV is not required.

18. The image capture device as recited in claim 11 wherein said detection of said presence of said hand does not require a pre-detection training sequence with said hand.

19. The image capture device as recited in claim 11 wherein said external apparatus is further configured to associate said position of said hand with an object displayed by said external apparatus in said FOV.

20. The image capture device as recited in claim 19 wherein said object displayed by said external apparatus in said FOV is moved corresponding to said command.

* * * * *